(12) United States Patent
Foxlin et al.

(10) Patent No.: US 8,762,091 B1
(45) Date of Patent: Jun. 24, 2014

(54) INERTIAL MEASUREMENT SYSTEM

(75) Inventors: Eric Foxlin, Lexington, MA (US); Sheng Wan, Irvine, CA (US)

(73) Assignee: Thales Visionix, Inc., Clarksburg, MD (US)

( * ) Notice: Subject to any disclaimer, the term of this patent is extended or adjusted under 35 U.S.C. 154(b) by 263 days.

(21) Appl. No.: 13/152,495

(22) Filed: Jun. 3, 2011

Related U.S. Application Data

(60) Provisional application No. 61/352,798, filed on Jun. 8, 2010.

(51) Int. Cl.
*G06F 19/00* (2011.01)
*G01P 15/00* (2006.01)

(52) U.S. Cl.
CPC .................................... *G01P 15/00* (2013.01)
USPC ......................................................... 702/87

(58) Field of Classification Search
CPC ....................................................... G01P 15/00
USPC ......................................................... 702/87
See application file for complete search history.

(56) References Cited

U.S. PATENT DOCUMENTS

| | | | |
|---|---|---|---|
| 6,477,465 B1 * | 11/2002 | McCall et al. ................ | 701/501 |
| 6,882,964 B2 | 4/2005 | Bayard et al. | |
| 7,650,238 B2 | 1/2010 | Reynolds et al. | |
| 2002/0109628 A1 * | 8/2002 | Diesel ...................... | 342/357.14 |
| 2008/0190206 A1 * | 8/2008 | Matsumoto et al. ............ | 73/597 |

OTHER PUBLICATIONS

Cho and Park, "A calibration technique for a redundant IMU containing low-grade inertial sensors", ETRI Journal 27(4) 2005.
Lapinski, "A wearable wireless sensor system for sports medicine", MS Thesis, MIT Media Lab 2008.

* cited by examiner

*Primary Examiner* — Bryan Bui
(74) *Attorney, Agent, or Firm* — Arent Fox LLP

(57) ABSTRACT

An apparatus for measuring an inertial property on a set of one or more axes is disclosed. The apparatus includes a first inertial sensor arranged to measure the inertial property, having a first predetermined resolution and a first predetermined measurement range, and a second inertial sensor arranged to measure the inertial property, having a second predetermined resolution and a second predetermined measurement range. The second resolution is coarser than the first and the second measurement range is larger than the first. A processing system is adapted to receive measurement signals from the first and second inertial sensors and, when the output of the first inertial sensor is within the first predetermined measurement range, to update an error estimate for adjusting the output of the second inertial sensor, based on the measurement signals from the first and second inertial sensors.

29 Claims, 5 Drawing Sheets

INERTIAL MEASUREMENT SYSTEM

CLAIM OF PRIORITY

This application claims priority from Provisional Application Ser. No. 61/352,798 filed Jun. 8, 2010. All subject matter set forth in the above referenced application is hereby incorporated by reference into the present application as if fully set forth herein.

BACKGROUND

Inertial Measurement Units (IMUs) for many applications require high performance gyroscopes and accelerometers to measure angular rate and linear acceleration with high precision and accuracy over a wide dynamic range. Traditionally this has been accomplished with exotic technologies such as mechanical or optical gyroscopes which result in large, power-hungry, and expensive IMUs.

In the past two decades there has been tremendous progress in the development of inertial sensors using micro-electromechanical systems (MEMS). MEMS inertial sensors can be used to produce IMUs with an enormous reduction in size, weight, power and cost. However, MEMS inertial sensors have not yet achieved sufficient performance to replace traditional IMUs in many guidance, navigation and control applications. So far, any individual MEMS inertial sensor has a shortfall in at least one aspect of performance, such as resolution, bias stability, dynamic range, temperature sensitivity, vibration sensitivity, or long-term bias or scale factor repeatability.

Redundant IMU (RIMU) configurations, utilizing more than three gyroscopes or accelerometers to determine angular rate or linear acceleration about three axes, have been used since the early days of inertial navigation to facilitate fault detection and isolation (FDI) in high-reliability aerospace applications. An explanation can be found in Cho and Park, "A calibration technique for a redundant IMU containing low-grade inertial sensors", ETRI Journal, Vol 27, No 4, August 2005 and its references.

More recently, a few approaches have been proposed using arrays of identical MEMS gyroscopes, with a reduction of noise and/or drift errors achieved by averaging all their outputs together [e.g., Reynolds et al, U.S. Pat. No. 7,650,238, Bayard and Ploen, U.S. Pat. No. 6,882,964]. The average may be weighted according to the relative quality of the different gyros, but because it involves some form of averaging of all the gyros, it cannot overcome the weaknesses of each individual gyro as effectively as the method described below.

Lapinski ["A wearable wireless sensor system for sports medicine", Michael Lapinski, MS. Thesis, MIT Media Lab, September 2008] built a system for monitoring baseball batters which includes both high-g accelerometers (necessary for the high dynamic range of sports motion) and low-g accelerometers which he added due to a concern about the limited resolution of the high-g accelerometers.

SUMMARY

In one particular embodiment, a design for an IMU combines multiple redundant inertial sensors having dissimilar but complementary performance characteristics to produce an IMU having performance superior to the individual components. By choosing different sensors having complementary strengths and weaknesses, and fusing their data together, it is possible to produce a seamless unified IMU signal which compensates the weaknesses of each individual sensor during the majority of the operating time, thus resulting in significantly improved results for the guidance, navigation, tracking, stabilization or control application which uses the data.

In a particular embodiment, a high performance composite inertial sensor (single axis or multi-axis) or a full six-axis IMU is constructed using very small and inexpensive components. By using two or more sensors per sensitive axis which sense the same inertial property (e.g. linear acceleration or angular rate) but have different characteristics, this can be accomplished with a far smaller number of individual sensors than in the prior art method using arrays of substantially similar or identical sensors combined by weighted averaging.

Many different types of combinations fall within the general scope and spirit of the invention, in addition to the particular preferred embodiments described in detail below. For example, in one particular embodiment, two gyroscopes having comparable ranges are fused, but one has significantly lower noise while the other has better bias stability. In this case it is desirable to output the signal from the low-noise "main" gyro while effectively "replacing" or "training" its bias with that of the more stable sensor. This can be accomplished with a complementary filter that passes through the high-frequency content from the low-noise sensor and the low-frequency "bias" of the other sensor. An easy way to design such a complementary filter is to simply output the signal from the main sensor plus a bias correction, wherein the bias correction is updated periodically by adding a fraction K of the difference between the noisy but stable "training" sensor and the main sensor. If it is known that the bias of the main sensor is particularly unstable under certain conditions, such as during rapid temperature changes or following mechanical shocks, then the gain K can be adaptively increased during these conditions to temporarily speed the recovery of the bias towards that of the more accurate sensor at the expense of admitting a little more noise temporarily.

In another preferred embodiment, two sensors with very different measuring ranges are combined. In most cases, there is a trade-off between range and resolution, so that noise and bias instability will generally be larger with larger measuring range. For example, an accelerometer with a 24 g measuring range might have a noise density of 800 µg/√Hz, while a similar device from the same manufacturer produced with essentially the same MEMS structure has about 200 µg/√Hz noise density in a 2 g measuring range. The "fusion" of data from devices with different ranges necessarily involves switching to use exclusively the high-range device when the input signal exceeds the measuring limits of the lower-range device(s). Clearly, the high-frequency sensor noise output will increase to that of the high-range sensor during this time, so in this case, the complementary sensors cannot correct for all the weaknesses of the high-range sensor all the time. However, in most applications the motion will be fairly gentle the majority of the time, with fairly short duration bursts of high acceleration or angular rate. Therefore, there is still great benefit in using a smaller range sensor with smaller errors to cover the majority of the motion, combined with a high range sensor just to cover occasional over-range conditions. Since the outputs of inertial sensors are integrated to track angle and position, a noise that occasionally increases leads to much less accumulated random walk error over time than a steady noise source. Furthermore, if the assumption of brief bursts of high dynamics is true, then there will be plenty of time when both sensor outputs are available during which the low-range sensor can be used to "train" or calibrate the high-range sensor. This can almost completely overcome the poor bias stability of the high-range sensor, as the bias will not have time to drift a great deal away from its calibrated value during brief bursts of high dynamics.

Many different types of algorithms could be used for the fusion of data from two or more sensors, including but not limited to a Kalman filter, a fixed-gain filter or gain-scheduling filter derived from a Kalman filter, a complementary filter, an adaptive filter whose gain depends on environmental conditions or the rate of change of one or more of the signals, a selector switch with a sharp transition between sensors, or a selector with a soft transition using interpolation. The following description refers to one particular preferred embodiment which is intended only to serve as an illustration. A person of skill in the art will recognize many other potential combinations of sensors or methods of fusing their data which take advantage of dissimilar properties of different types of sensors to compensate one another.

LIST OF FIGURES

DETAILED DESCRIPTION

Figure 1:
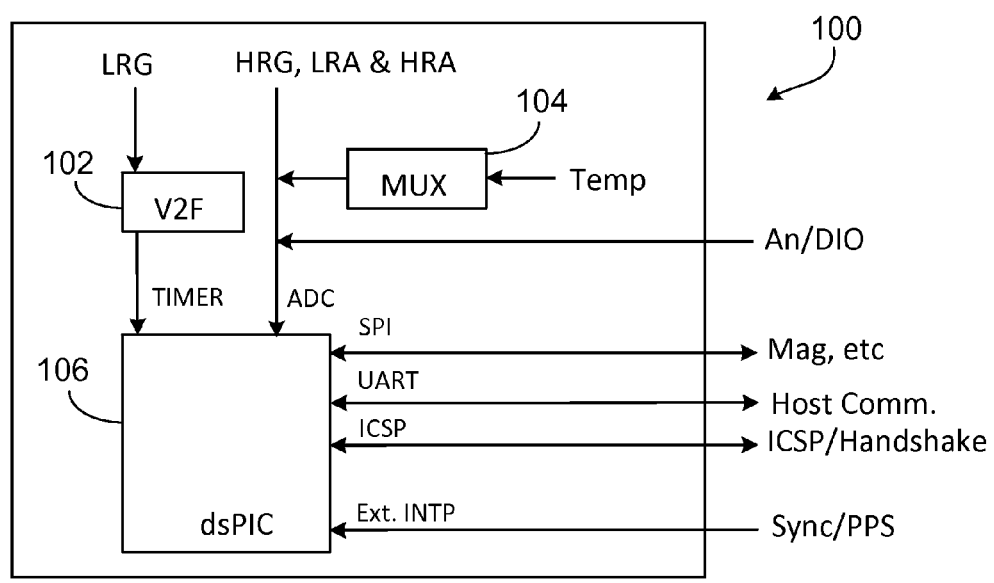
FIG. 1 is a block diagram of an inertial measurement system.

Referring to FIG. 1, one preferred embodiment, an inertial measurement unit 100 is a compact multi-chip module (MCM) that offers compensated $\Delta\theta$ and $\Delta V$ outputs representing the integrals of angular rate and linear acceleration about/along the x, y and z axes over each successive time interval $\Delta t$. (These are standard outputs of an IMU.) It can also function as an attitude and heading reference system (AHRS) to measure roll, pitch and yaw.

The inertial measurement unit 100 is capable of achieving a high performance by fusing the data gathered from redundant inertial measurement elements to sense using low and high range sensors. The inertial measurement unit 100 includes the following sensors listed in the table below.

TABLE 1

Inertial measurement unit 100's sensors description

| Sensor Type | Range | # Sensors | Description |
|---|---|---|---|
| Accelerometer | ±2 g | 3 | Low Range Accelerometers (LRA) |
|  | ±11 g | 3 | High Range Accelerometers (HRA) |
| Gyroscope | ±300 °/s | 3 | Low Range Gyroscopes (LRG) |
|  | ±2000 °/s | 3 | High Range Gyroscopes (HRG) |
| Temperature | −55° C. to 130° C. | 6 | 3 discrete near LRGs + 2 built into HRGs + 1 optional discrete near corner of package |
| Magnetometer | ±11 Gauss | 3 | Optional PNI magnetometers external to the inertial measurement unit 100, read in through SPI port |

Inertial measurement unit 100 samples all the 18 internal sensors (6 Accelerometers, 6 Gyroscopes and 6 temperatures) at i-Rate (1 KHz). In some embodiments, external sensors (e.g. magnetometers) may also be sampled.

The High Range Gyroscopes [HRG], High Range Accelerometer [HRA], Low Range Accelerometers [LRA] and Temperature [T] sensors are interfaced to a processor 106 through an inbuilt 12-bit Analog to Digital Converter [ADC] (not shown). The Low Range Gyroscopes [LRG] are interfaced to the processor 106 through Voltage to Frequency converters 102 [V2F] which have the advantage of pre-integrating signals in the analog domain so that no information is lost due to quantization or due to a sampling process. Data from the V2F converter 102 is acquired through clock counter peripherals. Inertial measurement unit 100 can be easily expanded to include external magnetometers. A host computer communicates with the inertial measurement unit 100 on a UART serial port or on an SPI port. Inertial measurement unit 100 incorporates an external Gen-lock/PPS sync signal to tightly couple an inertial measurement sampling rate with external systems.

Figure 2:
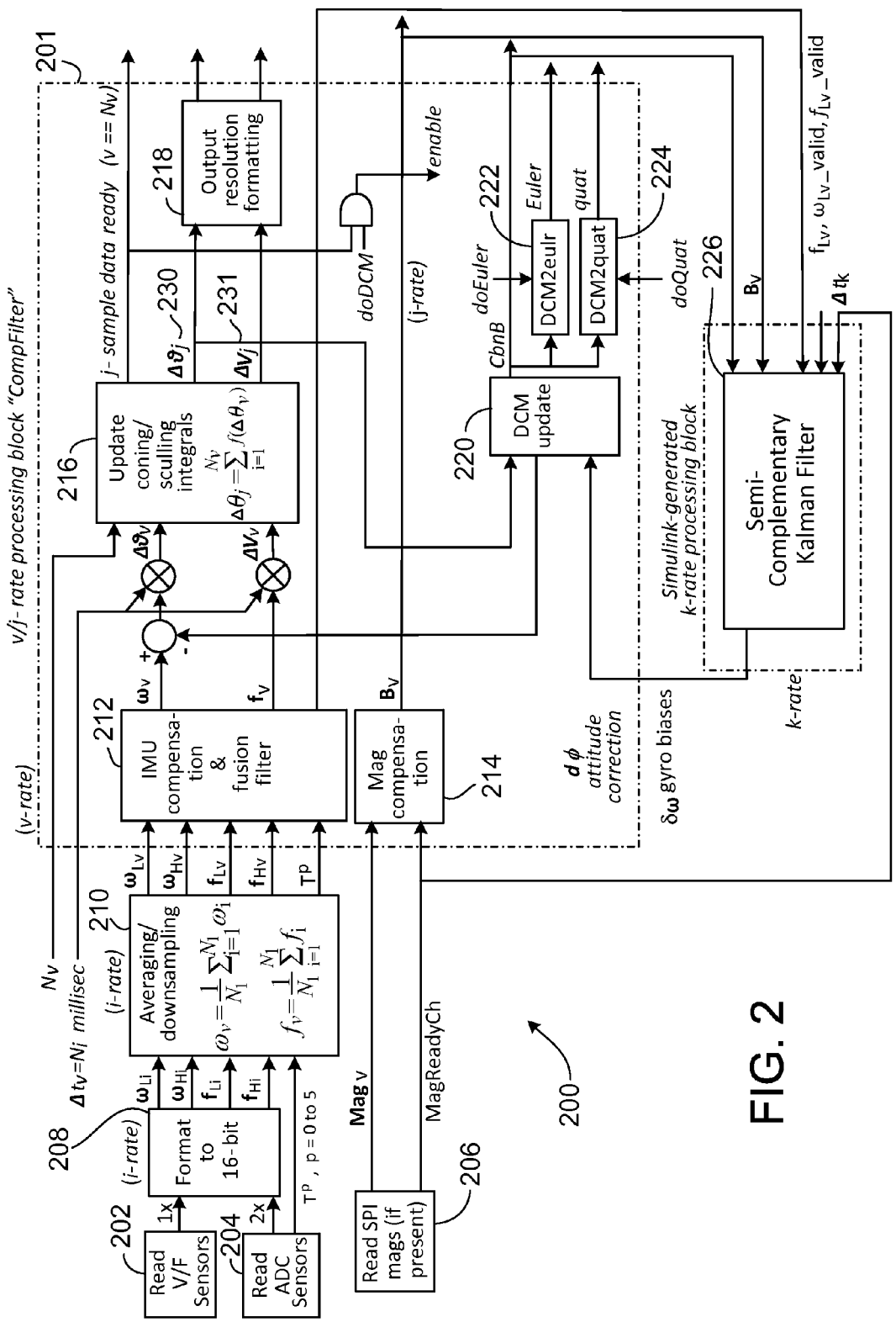
FIG. 2 is a data flow diagram of an inertial measurement system.

FIG. 2 shows a data flow diagram 200 for the entire inertial measurement unit 100 firmware, including an optional attitude and heading reference system 226 (AHRS) attitude update and Kalman filtering algorithms. The compensation of all sensors and fusion of multiple inertial sensors per axis is done within a block 212 labeled "IMU compensation and fusion filter", which will be described in greater detail below.

v/j-rate processing block ("CompFilter") 201 processes the raw inertial sensor data (gyroscope & accelerometer), and optionally magnetometer sensor data to produce different types of output message. Six temperature sensors are also used for thermal compensation. The Cartesian reference frame used for outputting all final sensor results is an intrinsic body frame with its origin at the center of the LRA, and the directions of the 3-axes being defined by mathematically orthogonalizing the LRA triad, wherein the x-axis coincides with the $a_x$ sensitivity axis, the y-axis is obtained by rotating the x-axis 90 degrees toward the $a_y$ sensitivity axis within the plane spanned by $a_x$ and $a_y$, and the z-axis by following the right-hand rule. Conceptually, the CompFilter 201 can be viewed as including a sensor compensation and fusion core block, which gets executed every time the CompFilter 201 is invoked, enhanced by additional augmented blocks which may or may not get executed when invoking the CompFilter 201, depending upon the configurations. The augmented blocks are output message type related with the dedicated task of computing the requested output such as Cbn (rotation matrix from body to navigation frame), Euler angles, etc. The core block is implemented using 16-bit fixed-point arithmetic.

Gyroscope Compensation and Fusion Filter Algorithms

The core block of the CompFilter 201 is the IMU Compensation and Fusion Filter block 212, which produces compensated $\Delta\theta$ and $\Delta v$ vectors 230, 231 from the raw data. The $\Delta\theta$ and $\Delta v$ vectors 230, 231 represent integrals of angular rates and linear accelerations respectively on each axis over the duration of one j-rate sample time (from the last reported data packet until the current one).

Figure 3:
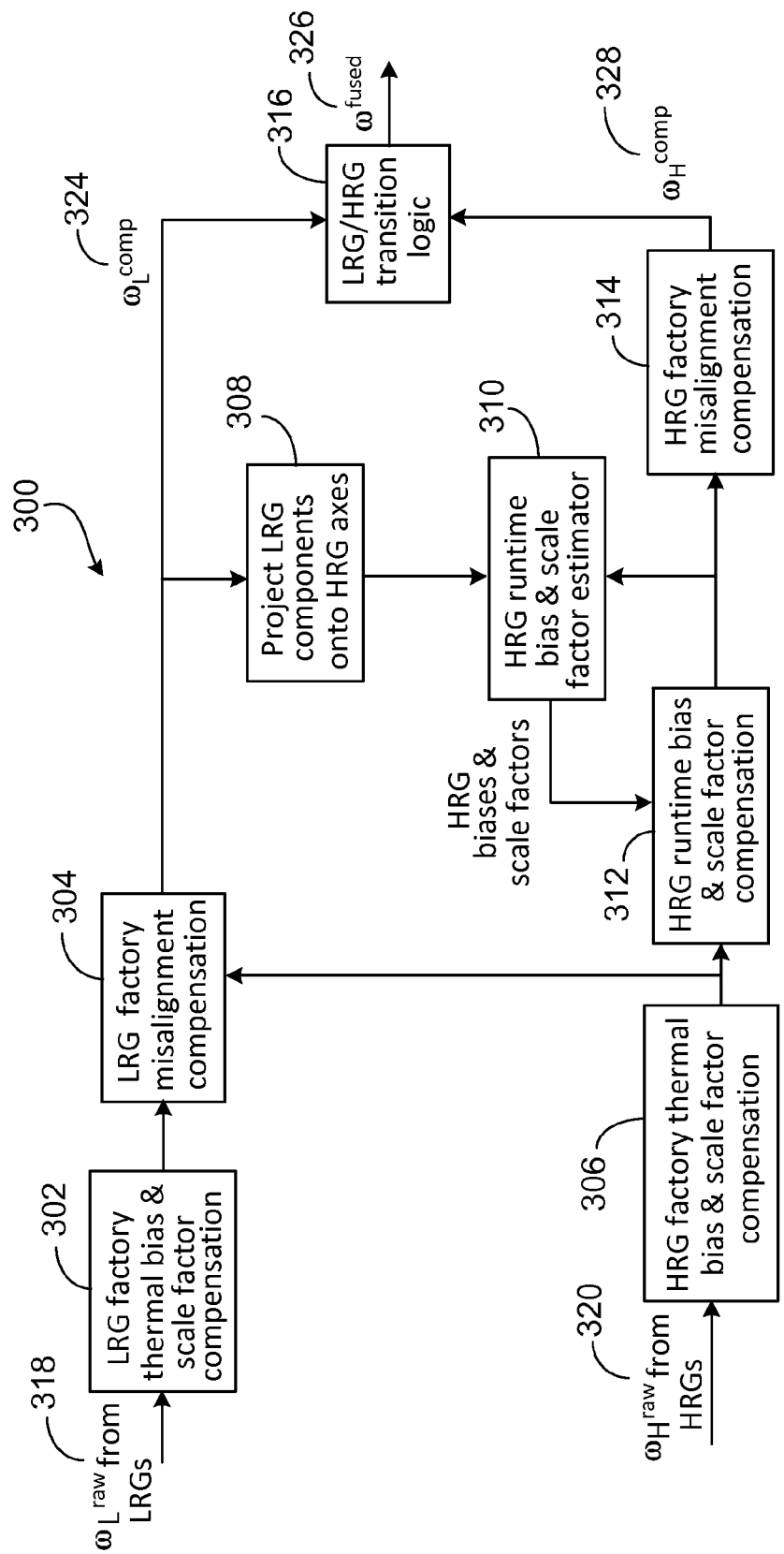
FIG. 3 is a data flow diagram of an algorithm for use in an inertial measurement system.

FIG. 3 illustrates the compensation and fusion algorithms 300 for the gyroscopes. LRG/HRG factory thermal bias and scale factor compensation algorithms (302, 306) convert the gyroscopes' raw data (318, 320) into properly-scaled physical units by subtracting the raw data from a calibrated bias and then multiplying the result by calibrated scale factors.

Inertial sensor compensation (304, 306) includes bias temperature sensitivity compensation and misalignment compensation. For LRGs, look-up tables are used for temperature compensation, while for other inertial sensors, $3^{rd}$-order polynomial are used. In some IMUs, a 3×3 inverse misalignment matrix left-multiplies a measurement vector to transform components into components aligned with the nominal body-frame axes. The compensation calculation is slightly more complicated on the Inertial measurement unit 100, because in some implementations, the inertial measurement unit 100 operates with one or more LRGs saturated at a limit of measurement range, and correcting misalignment of other non-saturated LRGs is still desirable. To correct the misalignment of the non-saturated LRGs, whichever LRGs are over range first have their values replaced by measurements from the corresponding HRG (or HRGs), and then a factory-calibrated inverse misalignment matrix is applied. Although the corrected HRG signals are not as accurate and are not at this stage perfectly aligned with the LRG axes, the HRG signals are only used in the computation of small error compensations, so small errors in the inputs only lead to second-order small error effects.

Project LRG components onto HRG axes (308). Fusion algorithms operating between pairs of sensors that are well aligned produce accurate matching of biases and scale factors and seamless transitions. The HRG native axes are used as the reference frame in which to do the matching, although other axes could also work. During factory calibration the misalignment matrices $(I+M_{LRG})^{-1}$ and $(I+M_{HRG})^{-1}$ are determined, which transform the LRG readings and HRG readings respectively into orthogonalized body-frame axes, and then compute the product $(I+M_{HRG})(I+M_{LRG})^{-1}$, which transforms the LRG readings into HRG axes.

Figure 4:
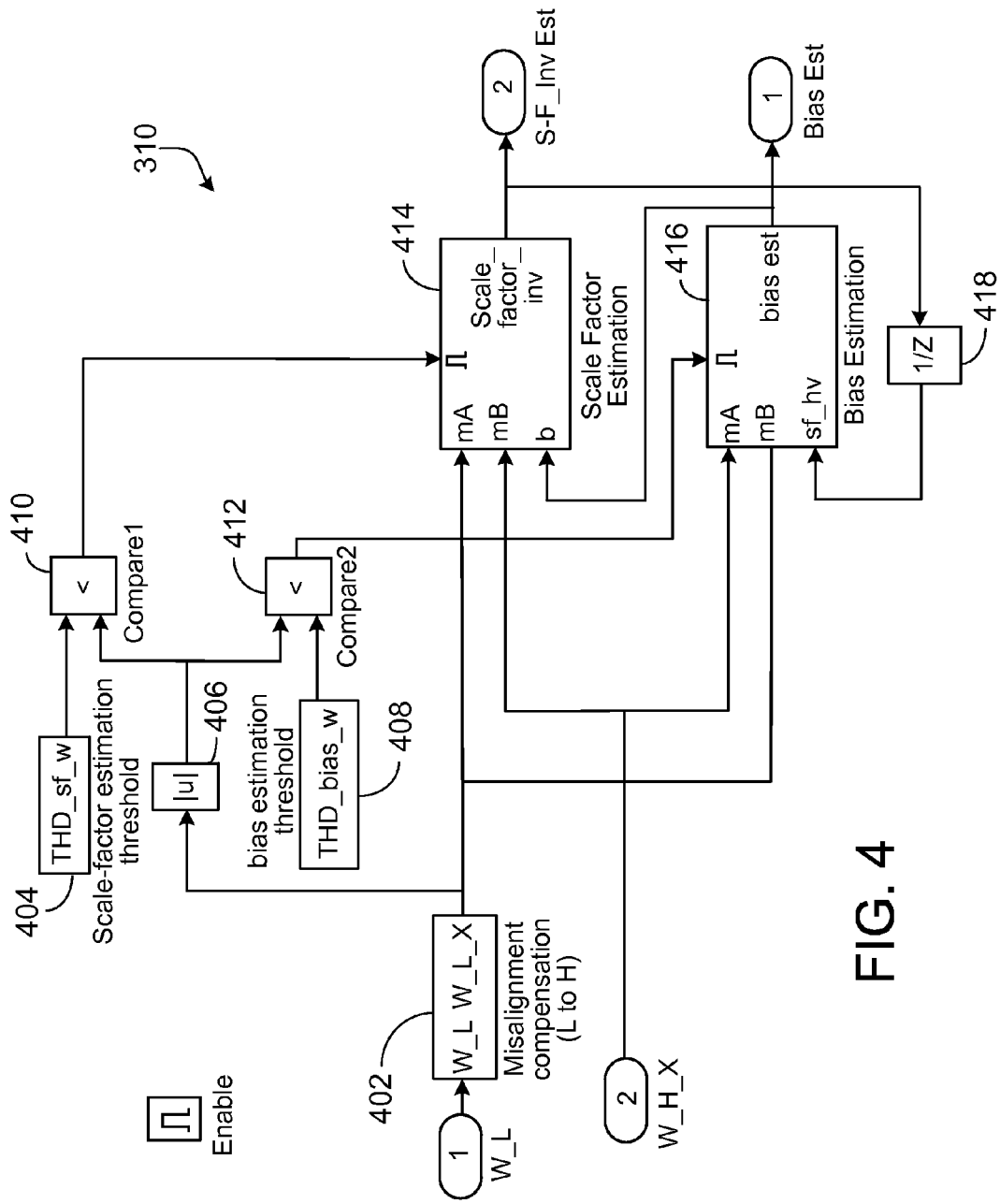
FIG. 4 is a data flow diagram of a component for use in an inertial measurement system.

HRG runtime bias & scale factor estimation and compensation (310, 312). The estimator uses the low-rate sensor as a reference to estimate a bias and scale factor error of the high-rate sensors. In one embodiment, illustrated in FIG. 4, when the rate is below a low threshold, any difference between the sensors is attributed to bias, and when the rate is above a higher threshold the difference is attributed to scale factor. This has a low computational burden and works well, although it may be possible to obtain a more accurate estimation using a Kalman filter to jointly estimate bias and scale factor error states for each HRG. Note that each HRG's bias and scale factor errors are determined in a separate estimator block. The compensation block 312 applies these dynamically "trained" bias and scale factor estimates 322 to each HRG, resulting in final compensated HRG measurement vectors that are consistent with the LRG readings after both are transformed into a common reference frame. The continuous runtime re-calibration of the HRGs by the more accurate and stable LRGs results in relatively seamless transitions, and imparts to the HRGs a higher bias and scale factor accuracy than the HRGs without re-calibration, which benefits the application by allowing for less error accumulation during periods of high dynamic motion.

HRG factory misalignment compensation (314). Because the bias and scale factor runtime compensation are performed in the native axes of the HRG sensors, standard factory-calibrated misalignment compensation is applied to the HRG triad to put the HRG triad in the same orthogonalized body-frame coordinates before the HRG triad can be "fused" with the LRGs. The factory misalignment compensation is applied by left-multiplying the HRG vector by $(I+M_{HRG})^{-1}$.

HRG/LRG selection logic (316). The output value is selected for each axis from either the corresponding LRG sensor, when the LRG sensor is not over its limit, or the HRG sensor. Because the HRGs used in the Inertial measurement unit 100 are noisier than the LRGs, there is not much reason to combine the two (e.g. with a weighted average) when both sensors are in range. However, a combination of readings from the multiple sensors could be a possibility in systems with more closely matched sensors. Another possibility would be to smooth the transition by gradually fading the weighting from one sensor to the other during the transitions.

Accelerometer Compensation and Fusion Filter Algorithms

Accelerometer compensation and fusion steps are similar to those described for the gyroscopes. A main difference is that angular rate signals from the gyroscope final result are passed in and used in an accelerometer block for centripetal and tangential acceleration compensation of HRA sensors to compensate for small acceleration differences the HRA sensors sense when the inertial measurement unit 100 experiences rotation or rotational acceleration due to the fact that the HRA sensors are not in the same location as the LRA sensors. The additional centripetal & tangential compensation block is inserted immediately after the HRA factory thermal bias & scale factor compensation block.

The foregoing describes one preferred embodiment that fuses two types of gyroscopes and two types of accelerometers. In some preferred embodiments, the LRG sensors and HRG sensors may be different types of gyroscopes, even using different technologies, selected to optimize respective important attributes. For example, the LRGs may be implemented using quartz micro-vibratory gyroscopes, such as those manufactured by Epson Toyocom in Japan or Systron-Donner of Concord, Calif. or Panasonic in Japan, which exhibit very low noise performance and good bias stability for their size and power consumption. Meanwhile, the HRGs may be implemented with silicon MEMS gyroscopes in order to save space, as triaxial gyroscopes with ranges up to ±2000°/s are available in a single package from InvenSense in California or ST Microelectronics in the Netherlands.

In another preferred embodiment, one or more of the LRGs may be implemented with a fiber-optic-gyroscope (FOG), such as those available from KVH in Rhode Island or Fizoptika in Russia, in order to achieve even better noise and stability performance, while trading off size, weight and power (SWaP) for improved performance. In particular, it may be cost-effective to use a mixture of different types of LRGs, arranged with the highest performing sensor having its axis in a nominally vertical direction, because for many applications a yaw-gyro drift rate has a bigger impact on performance than pitch and roll gyros. For example, two quartz gyroscopes for x and y LRGs and one FOG for a z LRG may be combined with a triaxial silicon MEMS HRG, because performance of the HRG is less critical.

In another preferred embodiment, both the LRGs and HRGs may be implemented with silicon MEMS devices. The whole IMU may be implemented on one circuit board with a very small SWaP, but would still have significant performance advantages over other MEMS IMUs, because the LRGs could be selected for optimal performance with respect to noise and bias stability, without having to sacrifice these attributes in order to achieve larger dynamic range.

In another preferred embodiment, the same physical gyroscopes could serve as both LRGs and HRGs, but with different signal conditioning and/or analog-to-digital conversion electronics in order to achieve two measurements with different resolution and range. For example a signal from a gyro could be simultaneously sampled by a simple 12-bit A/D, and at the same time an amplified version could be captured by a higher performance A/D or V2F mechanism in order to extract the best possible accuracy for the LRG signal while minimizing the amount of electronics required for the HRG signal. Many recent MEMS inertial sensors from InvenSense and ST come with dual outputs, one of which is unamplified and provides a larger range, and the other of which has passed through an internal amplifier to provide more sensitivity and less range. The algorithms described above could be applied as a means to blend the data from the two outputs and automatically calibrate a relative bias and scale factor differences between the two channels. In this embodiment, some simplifications could be made to FIG. 3 because both the LRGs and HRGs would have the same misalignments. The LRG factory misalignment compensation block 304, Project LRG components onto HRG axes block 308, and HRG factory misalignment compensation block 314 could all be omitted, and one factory misalignment compensation block could be added to the output after the LRG/HRG transition logic block 316 instead.

Figure 5:
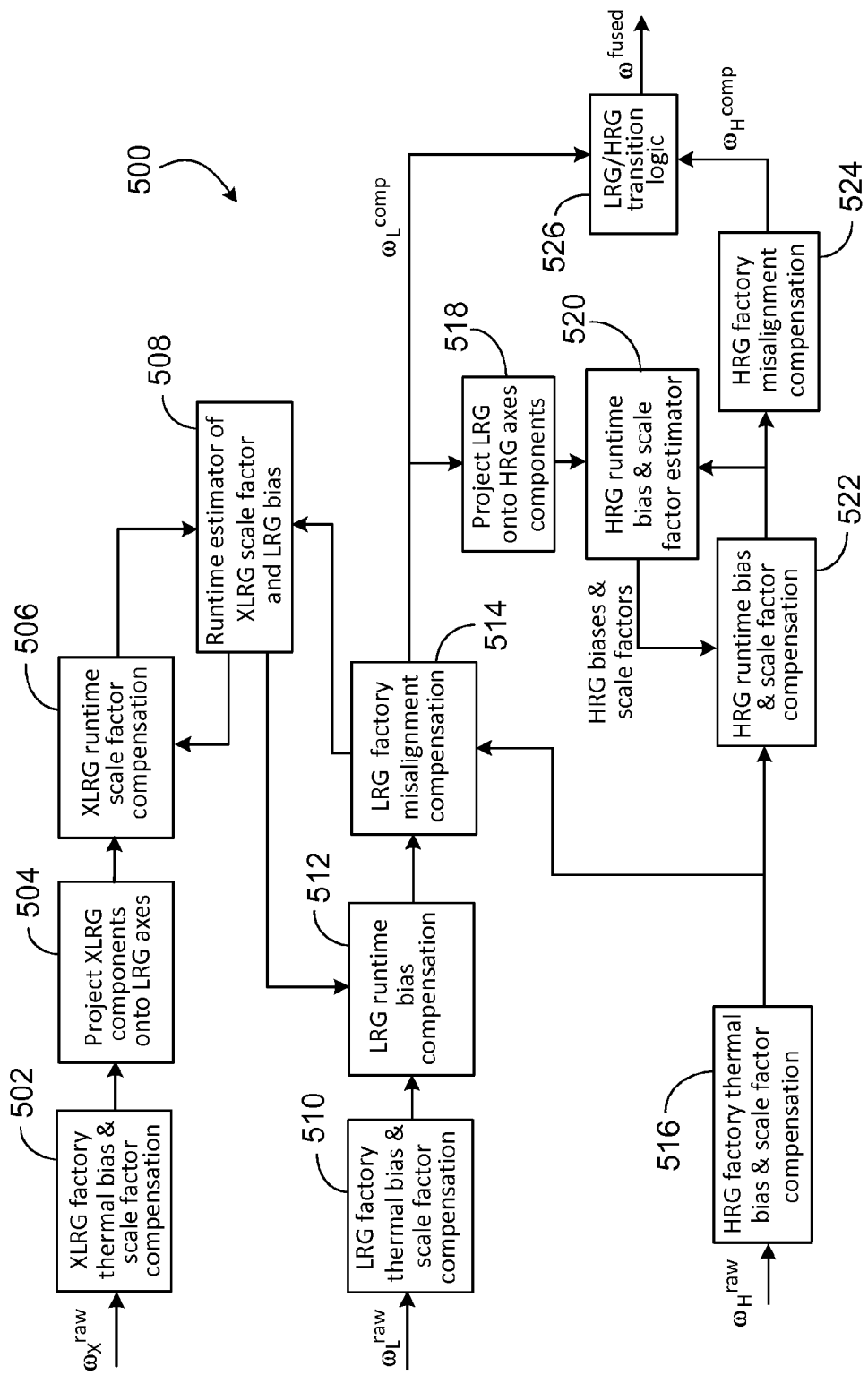
FIG. 5 is a data flow diagram of an algorithm for use in an inertial measurement system.

In another preferred embodiment, it may be advantageous to fuse more than two different types of gyroscopes, or more than two different types of accelerometers. FIG. 5 illustrates an example in which three different types of gyroscopes are fused together for even better performance. As before, the LRG has the lowest noise of the three types and also the highest scale factor accuracy, so the compensated signal of the LRG is used directly as the output value whenever the signal is not saturated. As before, the HRGs are provided for the purpose of extending the dynamic range, and the HRGs are trained to match the LRGs when the LRGs are providing useable (non-saturated) signals, and then substituted into the output when the LRGs are saturated. A third type of gyroscope, called an extra-low-range-gyroscope (XLRG) has been added for the purpose of improving the bias performance even beyond that of the LRGs. Bias performance could include one or more of the following attributes: in-run bias stability at constant temperature (bottom of Allan Variance), bias temperature coefficient (compensated residual), bias turn-on repeatability, sudden shifts in bias due to mechanical shocks, spontaneous stress relief in packaging materials, circuit impedance changes, etc.

A suitable sensor for the XLRG does not need to have noise as small as the LRG or range as large as the LRG, but should have at least some complementary bias performance capabilities such as in one or more of the listed characteristics. One way to find a sensor with such characteristics is to use a sensor with substantially smaller range even compared to the LRG. For example, the ST LPR503AL and LY503AL are pitch/roll and yaw gyroscopes respectively that have output ranges of just ±120°/s (unamplified) or ±30°/s (with built-in 4× amplifier). In some applications there will be frequent periods when the motion drops below these angular rates, and the XLRGs have an opportunity to re-calibrate the bias of the LRGs.

Most of the blocks in FIG. 5 have already been described in the discussion of FIG. 3 or perform substantially equivalent functions to similarly named blocks therein. One exception is runtime estimator of XLRG scale factor and LRG bias 508. Like the HRG runtime bias & scale factor estimator 520, the runtime estimator of XLRG scale factor and LRG bias 508 monitors the streams of data from two sensors and estimates bias and scale factor differences. However, as drawn, the runtime estimator of XLRG scale factor and LRG bias 508 is configured to change the scale factor of the XLRG and change the bias of the LRG, under an assumption that the LRG has better long term compensated residual scale factor accuracy and linearity. As can now be appreciated by one of skill in the art, there are numerous possible ways to use the inertial measurement system to correct the weak attributes while preserving the strong attributes from each constituent sensor, all of which are within the scope and spirit of the claims. The best configuration of the compensation and fusion algorithms will depend on the particular combination of sensors employed, and on the designer's understanding of the important characteristics of each sensor, which often need to be characterized through laboratory testing.

With respect to the data fusion algorithms, there are many ways to accomplish the main objectives of the inertial measurement system. The block diagrams illustrate one approach that is low in computational cost because all the estimation is broken down into small filters that compare two individual (scalar) sensor signals and estimate one or two correction terms. At the other extreme, it would also be possible (and may produce more optimal results) to design one large centralized Kalman filter to estimate the 6 IMU outputs, treating all the individual sensor readings as measurement inputs into the Kalman filter. The state vector would consist of the 6 output states (3 angular rates and 3 linear accelerations) augmented with error states such as biases or scale factors for each individual sensor that is deemed to require compensation to bring the sensor into accordance with the final fusion result. Unlike a complementary error-state filter, the whole-state filter a dynamics model would propagate the states between measurement updates, and the model would ideally be tuned depending on the expected dynamics of the application. [e.g. Foxlin, 1996, "Inertial head-tracker sensor fusion by a complementary separate-bias Kalman filter," IEEE VRAIS 96]

The computations described herein may be implemented using software, firmware, microcode, ASICs or any other known analog or digital processing system.

Other features, objects, and advantages of the invention will be apparent from the description and drawings, and from the claims. Other embodiments are also within the scope of the following claims.

What is claimed is:

1. An apparatus for measuring an inertial property on a set of one or more axes, comprising:
   a. a first inertial sensor arranged to measure said inertial property, having a first predetermined resolution and a first predetermined measurement range;
   b. a second inertial sensor arranged to measure said inertial property, having a second predetermined resolution and a second predetermined measurement range, wherein the second resolution is coarser than the first and the second measurement range is larger than the first; and
   c. a processing system;
   wherein the processing system is configured to receive measurement signals from said first and second inertial sensors and, when the output of the first inertial sensor is within the first predetermined measurement range, to update an error estimate for adjusting the output of the second inertial sensor, based on the measurement signals from said first and second inertial sensors; and
   wherein the processing system is configured to compute the inertial property using the output of the first inertial sensor when that output is within the first predetermined measurement range and using the adjusted output of the second inertial sensor when the output of the first inertial sensor is not within the first predetermined measurement range.

2. The apparatus of claim 1, wherein said inertial property is angular rate and said first and second inertial sensors are angular-rate sensors or gyroscopes.

3. The apparatus of claim 1, wherein said inertial property is linear acceleration and said first and second inertial sensors are accelerometers.

4. The apparatus of claim 1, wherein the error estimate comprises a bias estimate.

5. The apparatus of claim 4, wherein the error estimate further comprises a scale factor estimate.

6. The apparatus of claim 5, wherein the bias estimate is updated when the absolute value of the measurement signal of the first inertial sensor is below a first predetermined threshold, and the scale factor estimate is updated when the first sensor signal is above a second predetermined threshold greater than or equal to the first threshold.

7. The apparatus of claim 5, wherein both the bias and scale factor are jointly estimated at certain times using a recursive estimator whose output depends on a previous estimate and one new measurement set.

8. The apparatus of claim 5, wherein both the bias and scale factor are jointly estimated at certain time steps using a batch estimator whose output depends on the current measurement set and one or more previous measurement sets.

9. The apparatus of claim 4 wherein the processing system is configured to compute said bias estimate using alignment-compensated measurement signals.

10. The apparatus of claim 1, wherein said set of one or more axes comprises a set of three orthogonal body-frame axes and the first and second inertial sensor each comprise a set of three inertial sensors arranged to span the three axes.

11. The apparatus of claim 1, wherein the processing system is configured to adjust the measurement signals of at least one sensor to compensate for misalignment between sensors.

12. The apparatus of claims 1, wherein the processing system computes a stream of values of said inertial property so as to avoid substantial discontinuities in said stream between values computed based on output values of the first inertial sensor and values computed based on output values of the second inertial sensor.

13. The apparatus of claim 1, wherein the first inertial sensor and the second inertial sensor use the same physical measuring device with different signal conditioning methods.

14. The apparatus of claim 1, further comprising:
   a. a third inertial sensor arranged to measure said inertial property, said third inertial sensor having a bias performance that is superior to the first inertial sensor; and wherein the processing system is adapted to use measurement data from said third inertial sensor to compute a bias estimate for adjusting the output of the first inertial sensor.

15. The apparatus of claim 14, wherein the processing system is configured to compute a scale factor estimate for adjusting the output from the third inertial sensor, based on data from the first inertial sensor.

16. An inertial measurement unit (IMU) which outputs signals proportional to angular rates about three orthogonal axes and linear accelerations along the same three axes, comprising:
   a. a set of three angular rate sensors spanning the three axes and adapted to produce a stream of angular rate data;
   b. a first set of three accelerometers spanning the three axes and adapted to produce a first stream of linear acceleration data;
   c. a second set of three accelerometers spanning the three axes and configured to produce a second stream of linear acceleration data;
   d. a compensator that is configured to use the stream of angular rate data to compensate for at least one of centripetal or tangential acceleration in the first stream of linear acceleration data, thereby producing a stream of compensated linear acceleration data; and
   e. a selector that is configured to generate a unified stream of data by selectively including data elements that are from, or derived from, the stream of compensated linear acceleration data and the second stream of linear acceleration data.

17. A sensor system for measuring a physical property, comprising:
   a. a first sensor for measuring the physical property, said first sensor having first and second performance characteristics;
   b. a second sensor for measuring the same physical property, and having a first performance characteristic that is inferior to the first performance characteristic of the first sensor and a second performance characteristic that is superior to the second performance characteristic of the first sensor;
   c. a data stream generator for fusing data from measurements of the first sensor and data from measurements of the second sensor to form a stream of measurements of the physical property by the sensor system, wherein the sensor system has a first performance characteristic that is at least as good as the first performance characteristic of the first sensor and a second performance characteristic that is at least as good as the second performance characteristic of the second sensor.

18. The system of claim 17 in which the first performance characteristic is noise performance and the second performance characteristic is measurement range.

19. The system of claim 18 further comprising a third sensor having better bias stability than either the first or second sensor, and in which the sensor system has bias stability at least as good as the third sensor.

20. The system of claim 19 wherein the sensor system has scale factor accuracy at least as good as whichever sensor has the best scale factor accuracy.

21. The system of claim 17 in which the first performance characteristic is noise performance and the second performance characteristic is bias stability.

22. The system of claim 21 further comprising an adaptive filter to adjust the time constant for bias correction of the first sensor by the second sensor.

23. The system of claim 22 wherein the adaptive filter adapts in response to environmental conditions capable of causing bias changes in the first sensor.

24. The system of claim 23 where the environmental conditions include one or more of temperature, temperature change rate, vibration, shock, pressure, pressure change rate or RF interference.

25. The system of claim 22 wherein the adaptive filter adapts in response to rapid changes in the bias difference between the first and second sensor.

26. The system of claim 17 in which the first sensor is a silicon MEMS gyroscope and the second sensor is selected from the set of a quartz piezoelectric gyroscope, a ceramic piezoelectric gyroscope, an optical gyroscope, or a bulk-acoustic-wave gyroscope.

27. A method for measuring an inertial property comprising:
   a. deploying a first inertial sensor arranged to measure said inertial property, the sensor having a first predetermined resolution and a first predetermined measurement range;
   b. deploying a second inertial sensor arranged to measure said inertial property, the second sensor having a second predetermined resolution and a second predetermined measurement range, wherein the second resolution is coarser than the first and the second measurement range is larger than the first;

c. in a processing system:
  i. receiving measurement signals from said first and second inertial sensors and, when the output of the first inertial sensor is within the first predetermined measurement range, updating an error estimate for adjusting the output of the second inertial sensor, based on the measurement signals from said first and second inertial sensors; and
  ii. computing the inertial property based on the output of the first inertial sensor when that output is within the first predetermined measurement range and based on the adjusted output of the second inertial sensor when the output of the first inertial sensor is not within the first predetermined measurement range.

28. The method of claim 27, further comprising:
a. deploying a third inertial sensor arranged to measure said inertial property, said third inertial sensor having a bias performance that is superior to the first inertial sensor; and
b. in the processing system,
  i. receiving measurement signals from said third inertial sensor;
  ii. computing a bias estimate for adjusting the output of the first inertial sensor, based on data from the third inertial sensor.

29. The method of claim 28, further comprising:
a. in the processing system, computing a scale factor estimate for adjusting the output from the third inertial sensor, based on data from the first inertial sensor.

\* \* \* \* \*